United States Patent [19]

Hummelstedt et al.

[11] 4,120,817
[45] Oct. 17, 1978

[54] EXTRACTION AGENT COMPOSITION

[75] Inventors: Leif Erik Ingmar Hummelstedt; Bror Göran Nyman, both of Turku; Raimo Juhani Leimala, Pori, all of Finland

[73] Assignee: Outokumpu Oy, Helsinki, Finland

[21] Appl. No.: 617,694

[22] Filed: Sep. 29, 1975

Related U.S. Application Data

[63] Continuation of Ser. No. 373,764, Jun. 26, 1973, abandoned.

[30] Foreign Application Priority Data

Jul. 3, 1972 [FI] Finland .............................. 1891/72

[51] Int. Cl.$^2$ .............................................. B01F 1/00
[52] U.S. Cl. ................................ 252/364; 75/101 BE; 75/117; 75/119; 75/120; 75/121; 252/354; 423/24; 423/99; 423/139
[58] Field of Search ................. 252/364, 354; 423/139

[56] References Cited

U.S. PATENT DOCUMENTS

| 3,276,863 | 10/1966 | Drobnick et al. ..................... 423/139 |
| 3,428,449 | 2/1969 | Swanson ........................ 75/101 R X |
| 3,655,347 | 4/1972 | Mattison et al. ................... 75/117 X |

FOREIGN PATENT DOCUMENTS 663,591 5/1963 Canada ...................................... 423/139
959,813 6/1964 United Kingdom ..................... 423/139

OTHER PUBLICATIONS

VanHaranta: "Extraktion Ay Ni(II), Med. Blandade Extraktionsmedel.," Master's Thesis, Approved by Faculty of Chemical Engineering at Abo Akademi, Finland, on Nov. 17, 1972, and accessible in Archive of Faculty from Nov. 17, 1972.

*Primary Examiner*—Richard D. Lovering
*Attorney, Agent, or Firm*—Brooks, Haidt, Haffner & Delahunty

[57] ABSTRACT

An extraction agent composition comprising in addition to one or more conventional extraction agents at least one agent, preferably a strong organic acid, affecting the phase interface tension for diminishing the drop size of the dispersed phase and for accelerating the conversion of the material from one phase to another for the separation of nickel (II) and cobalt (II) from each other from aqueous solutions containing both nickel and cobalt. By using said composition the separation can occur regardless of the type of counter-ion, i.e. said separation can take place from sulphate, nitrate and chloride solutions. Basing the separation on a high chloride content or on the necessity of oxidizing the cobalt being present into a trivalent state has been avoided by the addition of a small amount of strong organic acid.

5 Claims, No Drawings

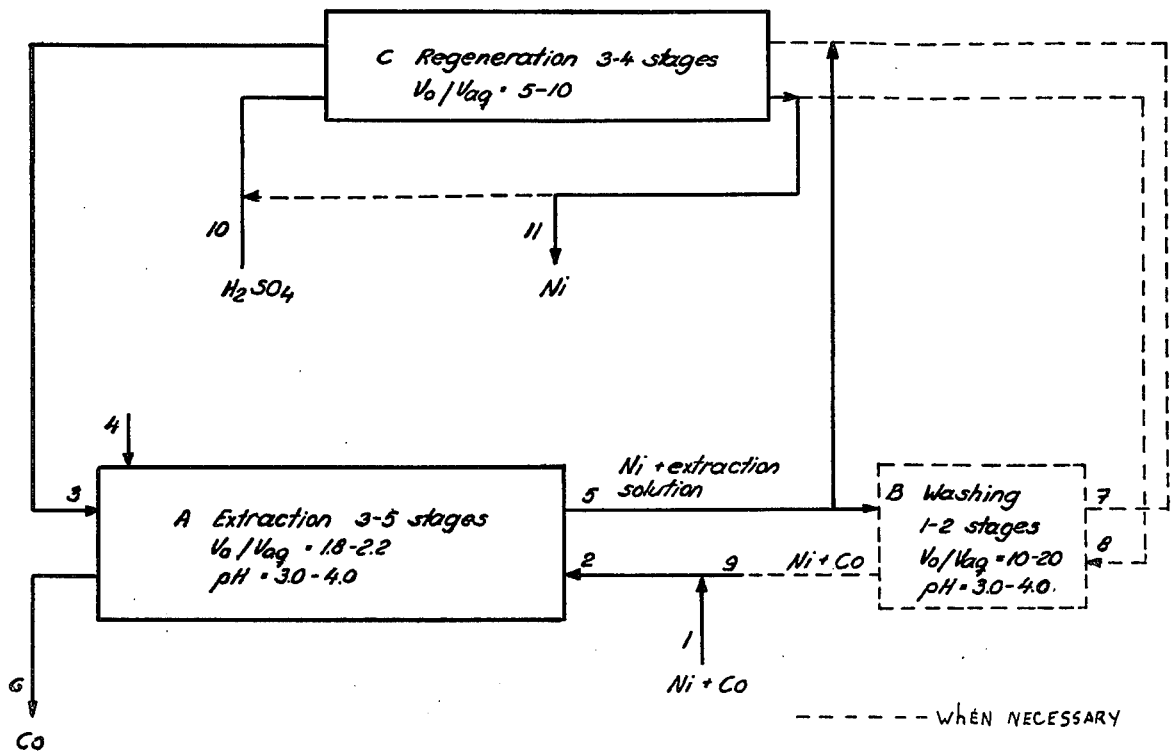

EXTRACTION AGENT COMPOSITION

This is a continuation of application Ser. No. 373,764, filed June 26, 1973, and now abandoned.

BACKGROUND OF THE INVENTION

1. Field of the Invention

The invention relates to an extraction agent composition for the selective extraction of one or more metals from a metal-containing aqueous solution in an organic medium and particularly to an extraction agent for the selective extraction of nickel (II) and cobalt from an aqueous solution.

2. Description of the Prior Art

Great attention has constantly been paid to the separation of the valuable metals nickel and cobalt in metallurgy. This separation has, however, proven very difficult to control. Among the alternative hydrometallurgical separation processes which have had some success are, primarily, the methods according to which the separation of the metals in question takes place in a strong chloride environment. Depending on the actual ores and their concentrates, the recovery of metals is mainly based on sulphates, i.e. the metals which are present are separated at the extraction stage in the form of their sulphate salts.

In addition to nickel and cobalt, the extraction solution in question often contains iron, copper, and zinc. At the solution purification stage it is not difficult to remove the latter metals from sulphate solutions. With the exception of the most modern extraction processes, copper and zinc, for example, are removed in the form of sulphides by precipitation, in which case the ferric iron which is present is simultaneously reduced into a bivalent state, which is often advantageous considering the further treatment. The problem now to separate the nickel (II) and cobalt (II) which are present has been solved according to various patents, such as U.S. Pat. Nos. 3,085,054, 3,128,156, 3,131,998, 3,194,652 and Duth patent No. 6,600,609, by using a strong chloride environment, i.e. in most cases it has been necessary to carry out an anion exchange from a sulphate into a chloride. It has been suggested that this can be achieved with a cation exchange type extraction agent such as for example, light petroleum. After the nickel and cobalt have been extracted from the sulphate solution in question into said extraction agent, the metals are removed from the latter by means of a strong hydrochloric acid (6-9 M), at which time the di-nonyl-naphthalene-sulphonic acid becomes simultaneously regenerated. From such a hydrochloric acid solution the cobalt can be extracted selectively by means of various amines or ammonium salts, preferably tertiary amines or quaternary ammonium salts. Such an anion exchange type extraction reagent binds the formed tetrachloride cobaltate, while nickel, which does not form an analogous complex, does not end up in the organic phase. The extracted cobalt can be simply removed from the organic phase by bringing the phase in contact with water, which rapidly causes a hydrolytic decomposition of the chloride cobaltate which is present. Thereafter both the nickel and the cobalt can be recovered from the solutions by known methods. An interesting possibility of combining the recovery of nickel and cobalt with their separation from each other is offered by the autoclave method, which is also based on chlorides. Promising results have been reported in regard to the selective reduction of nickel with gaseous hydrogen in an autoclave, followed by the reduction of cobalt under somewhat altered reduction conditions.

The separation of nickel (II) and cobalt (II) can thus be achieved in an acid chloride environment in which the chloride content has been raised to value 200-300 g $Cl^-/l$ in most cases. Because such chloride solutions are highly corrosive, the use of a chloride requires a treatment apparatus which is as corrosion-resistant as possible. Usually the purpose is not to perform the entire metal recovery process on a chloride basis but the idea has been to proceed to an appropriate chloride environment only at the nickel/cobalt separation stage. Because then, due to corrosion as well as purely practical factors, the use of both sulphate and chloride solutions in the same solution purification process requires special measures, it is very important to be able to carry out the difficult separation of nickel and cobalt from each other without the presence of a chloride, preferably regardless of the type of the counter-ions.

Even though in most cases it has been possible to achieve the desired separation through extraction, unexpectedly great problems have been faced in finding a suitable extraction agent for separating nickel (II) and cobalt (II) from, for example, sulphate-based water solutions. This has, however, succeeded with the use of complicated, often unstable, extraction reagents with a questionable technological value. However, the results which have been achieved with acid thiophosphates according to U.S. Pat. No. 3,336,133 have proven promising. In another suggested separation process, U.S. Pat. No. 3,276,683, the chloride has been eliminated by oxidizing the cobalt with oxygen, air, hydrogen peroxide, ammonium peroxide, or some other similar reagent into a trivalent state, preferably in an ammoniacal environment and by then performing a relatively selective extraction of nickel (II) with α-hydroxy-oxime for the extraction agent. Thereafter the extracted nickel is separated from the organic phase by means of a strong acid solution or an ammonia solution. However, some serious disadvantages seem to be linked to this separation process, some of them being the slow oxidation of cobalt with air, equally slow extraction of nickel, low extraction capacity, and poor capability of being regenerated with sulphuric acid solution.

One of the principal objectives of the present invention is to provide an improved extraction agent for the separation of nickel (II) and cobalt (II) from each other from aqueous solutions containing both nickel and cobalt. It has been considered very important that the separation be possible regardless of the type of the counter-ion, i.e., that the said separation must be possible from both sulphate, nitrate, and chloride solutions. Basing the separation on a high chloride content, or a necessity of oxidizing the cobalt which is present into a trivalent state, has been specifically avoided.

The object of the present invention is thus to provide an extraction agent composition for separating metals from an aqueous solutions, an extraction agent composition of which the extractive properties are relatively little dependent on the anion environment in the water solution. According to this invention it is possible to obtain a decisively improved extraction solution for various metal separation processes by adding a small amount of, for example, a strong organic acid to an extraction solution which contains one or more extraction agents. Especially a number of various sulphonic acids have proven highly practicable for this purpose.

A synergetic extraction solution which contains carboxylic acid, hydroxy-oxime, and a small amount of the crucial sulphonic acid is especially practical for the separation of nickel (II) and cobalt (II). It has been noted (D. S. Flett and D. W. West, ISEC 71) that the separation process of nickel (II) and cobalt (II) can hardly be based on an extraction agent composition containing α-hydroxy-oxime ("LIX-63") and naphthenic acid, in spite of the obtained advantageous nickel/cobalt separation coefficients, because said extraction agent composition for some unknown reason reacts very slowly with nickel. It has been proven, however, that by using the extraction agent composition according to the present invention it is possible to carry out a rapid extraction of nickel with a composition of acids and oximes. If a small amount of a sulphonic acid, such as a sulphonated, alkyl-substituted naphthalene product di-nonyl-naphthalene-sulphonic acid, which is abbreviated DNNS, or "ECA 6414" or a sulphonic acid which contains aliphatic and/or aromatic groups and has a branching molecular structure, is added to an extraction solution which consists of hydroxy-oxime and carboxylic acid in a non-polar solvent, the result is an excellent extraction agent composition for nickel extraction. With this extraction solution composed of three different components, nickel (II) and cobalt (II) can be separated in a process in which the separation of the said metals takes place advantageously according to the counter-current principle by using the separation scheme illustrated in the accompanying FIGURE. In spite of the possible strict purity requirements, the necessary number of stages usually remains relatively low because an extraction agent composition according to this invention makes it possible to achieve such high separation coefficients as 150. The great advantage of this extraction agent composition is that it does not require any definite anion environment but functions excellently in, for example, sulphate-based solutions.

SUMMARY OF THE INVENTION

According to the invention it has been conceived that a small addition of a sulphonic acid to an appropriate extraction agent composition has a most decisive importance as a factor which increases the reaction velocity in the nickel/cobalt separation process. The extraction solution according to the invention comprises in addition to one or more conventional extraction agents at least one agent affecting the phase interface tension for diminishing the drop size of the dispersed phase and for accelerating the conversion of the material. Even a small addition of a sulphonic acid, such as DNNS or "ECA 6414" usually lowers the interface tension between the phases in question, in which case the said drop size decreases, i.e., the phase interface area which affects the material conversion velocity increases. This means that with a small addition of material it is in certain cases possible to decisively accelerate the conversion of material from one phase to another, which would otherwise require a considerable increase in the mixing of the phases.

Generally this addition of material to an extraction solution to improve it is so small that it cannot have a noteworthy effect on the extracted amount of metal. However, the situation may be different when relatively small amounts of material are extracted, for example, when extraction is applied to the removal of metallic impurities from an aqueous solution. When extraction solutions were developed, it was proven that certain synergetic carboxylic acid/hydroxy-oxime compositions were well applicable to the removal of many heavy metals, such as iron, nickel, chromium, manganese, copper, zinc, and cobalt, from aqueous solutions because said extraction solutions extract many metals already within a relatively acid pH range. Such purification by extraction can be very well applied to the simultaneous removal of heavy metals from process solutions which may be water solutions containing an alkali metal, an earth alkali metal, a rare earth metal, etc. The most common impurity is iron, which, however, causes harmful precipitation in the said extraction solution, especially when the pH value of the aqueous phase to be purified must be brought above 3 in the simultaneous removal of heavy metals because of a certain metal. Since the result of purification easily declines because of the precipitate and this causes organic material losses, it is extremely important to eliminate the precipitation caused by even small amounts of iron in the extraction solution. It has been proven that by adding a small amount of sulphonic acid, such as "ECA 6414," to the carboxylic acid/hydroxyoxime composition, it is possible to considerably increase the pH of the said water solution during the extraction without causing a precipitate in the thus prepared extraction solution even though it contains some iron. Obviously precipitation is eliminated because the conversion of iron into the extraction solution is accelerated by the sulphonic acid and because the iron partly becomes bound to the sulphonic acid.

Much attention was given to the possibility of using an extraction agent composition which yields protons for the separation of nickel (II) and cobalt (II), because the newly adopted automatic pH control method based on pH values measured directly from the dispersion proved highly practical in regulating the difficult separation procedures. In spite of successful pH control, better separation coefficients were sought than those which had been achieved with certain slightly nickel-selective carboxylic acids (British patent No. 959,813) or respectively with somewhat cobalt-selective alkyl-phosphoric acids (U.S. Pat. No. 3,399,055). As to the numerous aliphatic and aromatic hydroxy-oximes, these reagents are mainly known for their selectivity in regard to copper. With pure oxime products it is hardly possible to extract great amounts of nickel or cobalt from acid solutions. If, however, especially hydroxy-amines, and, for example, carboxylic acids are mixed together in an appropriate solvent, such as a non-polar hydrocarbon, a so-called synergetic extraction solution is obtained which extracts metals, such as nickel, from even acid solutions because of the metal-oxime complexes formed in the extraction solution and usually solvated by carboxylic acids. An extraction solution of this type is clearly nickel selective. Consequently, by choosing an appropriate oxime-carboxylic acid composition it is possible to obtain an excellent separation coefficient even for the nickel/cobalt pair which is difficult to separate. This extraction solution has, however, a great disadvantage in the slowness of this nickel extraction, which is a serious obstacle for the technological use of this separation process. It is not advantageous to replace the carboxylic acid with, for example, organic sulphonic or phosphoric acids, because the separation coefficient of nickel extraction is then considerably lower.

It is, however, possible to considerably improve the velocity of nickel transfer into a carboxylic acid/hydroxy-oxime- based extraction solution by adding to it a small amount of, for example, a suitable strong organic acid, such as DNNS di-nonylnaphthalene-sulphonic acid) or "ECA 6414." A surprisingly strong effect on the reaction velocity was noted already when the DNNS content was, for example, 0.01 M. Regeneration with sulphuric acid is also accelerated by an addition of DNNS. Thus, for example, a kerosene solution which contains 1.3 M "Versatic 9-11," 0.01 M DNNS/l, and 25% by vol. "LIX-70" has been noted to be highly advantageous in separating nickel (II) and cobalt (II) from each other.

The hydroxyoximes used according to the present invention include aliphatic hydroxyoximes and those responding to the general formula

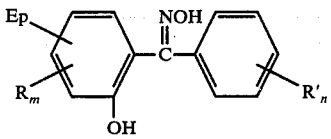

wherein R and R' indicate saturated aliphatic groups containing 1-25 carbon atoms, unsaturated aliphatic groups containing 3-25 carbon atoms, or an OR" group where R" is such saturated or unsaturated aliphatic group; E is hydrogen or a group which attracts electrons; $p$ has a value of 1, 2, 3, or 4; $n$ has a value of 0, 1, 2, 3, or 4; and $m$ is 0 or an integer with a value of no more than $(4-p)$.

The carboxylic acids contemplated for use herein are cyclic carboxylic acids or those having a branching hydrocarbon chain. A preferred branching hydrocarbon chain carboxylic acid is "Versatic 9-11" which is a carboxylic acid composition with the general formula

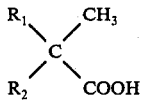

which contains 9-11 carbon atoms, wherein $R_1$ and $R_2$ each indicate an alkyl which as 3-6 carbon atoms. "LIX-70" and "LIX-64N" which is mentioned below are oximes produced by General Mills Inc. (U.S. Pat. Nos. 3,224,873 and 3,428,449, and Swedish patent application 6294/70).

The separation of nickel (II) and cobalt (II) from each other with the said synergetic extraction solutions takes place preferably by using the separation schedule presented in the accompanying FIGURE. The separation process is based on counter-current extraction in extraction apparatuses which are preferably of the mixer-settler type. The phase volume flows and the necessary number of phases have been disclosed in the schedule for the separation of nickel and cobalt from each other from, for example, a sulphate solution which contains 10 g Ni/l and 25 g Co/l. In addition the said sulphate solution may contain varying amounts of an electrolyte, such as $Na_2SO_4$, $(NH_4)_2SO_4$, etc.

The performed extraction trial series indicated that, for example, an extraction solution which contains 1.3 M "Versatic 9-11"/l, 0.01 M DNNS/l, and either 25% by vol. "LIX-70" or 25% by vol. "LIX-64N" causes the maximum separation of nickel (II) and cobalt (II) from each other at a pH value of about 3.8 with an extraction agent composition containing "LIX-70" and within pH range 4.5–5.0 with an extraction solution containing "LIX-64N." Below, the numerical data relating to an extraction solution which contains "LIX-64N" are given in parentheses immediately after the respective data concerning an extraction solution which contains "LIX-70." If the ratio between the volume flows of extraction solution 3 and sulphate solution 2 flowing into extraction system A (abbreviated Vo/Vaq, i.e., the ratio of the organic solution flow to the aqueous solution flow) is controlled at a value of about 2 (2.5), it has been proven that 3–5 (5–7) extraction stages are necessary for the complete separation of practically all the nickel which is present from the inflowing sulphate solution. The process chemistry wich has been developed is highly advantageous in regard to pH control. If the sulphate solutions fed into the separation stages are not too acid, pH control with, for example, ammonia, is necessary in the entire separation process at only two or three extraction stages, preferably at the middle one, possibly at the second to the last, and necessarily at the last extraction stage into which the regenerated extraction solution is fed, because the following extraction reactions prevail at the last extraction stage into which the regenerated extraction solution is fed, because the following extraction reactions prevail at the last extraction stages.

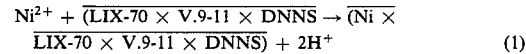  (1)

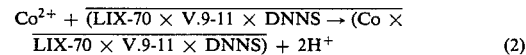  (2)

Thus, the pH of the sulphate solution does not tend to greatly change at extraction stages other than the last two at which protons are generated from the extraction solution as a consequence of the extraction reactions. Since according to the adopted method the pH of each extraction stage can be automatically controlled with precision with appropriate additions of a reagent, it is also possible to use a pH gradient between the stages to make the separation more effective. Reactions prevailing at these stages does not affect the pH of the sulphate solution.

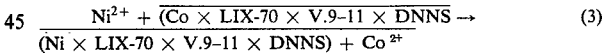  (3)

The purpose of the next treatment stage B is to remove from extraction solution 5 by ion exchange reaction (3) and counter-currently to the small flow of nickel-containing washing solution 8 the cobalt which has become extracted into solution 5. When an extraction solution containing "LIX-70" is used, a wash of this type is hardly necessary except when the purpose is to also obtain a very pure nickel solution from the separation process. The washing of the cobalt from the extraction solution can take place by means of the nickel flow in 1–2 (3–4) washing stages. The nickel flow used for this is only a fraction of pure nickel flow 11 obtained from the separation process. Owing to the pH buffering of the organic phase, the pH value of the washing solution then settles appropriately close to the pH value used at the first extraction stage, provided that the nickel-containing aqueous solution fed into the washing process is not too acid. It is advantageous to keep both the volume flow ratio Vo/Vaq and the nickel content in the washing solution as high as possible. The possible Vo/Vaq ratio is, for example, within range 10–20 and the possible nickel content within range 20–40 g Ni/l, for example. Cobalt is preferably combined with sulphate solution flow 1 which contains cobalt and nickel and is conducted to the extraction stage. Nickel-containing extraction solution 7 from the washing stage or 5 directly from the extraction stage is fed to regeneration stage C, where the nickel is removed counter-currently with sulphuric acid solution 10 which contains, for example, 100–200 g $H_2SO_4$/l. If an almost neutral strong nickel solution is desired from the regeneration stage, when the phase volume flow ratio Vo/Vaq is, for example, 5, the regeneration must be carried out with an appropriately strong sulphuric acid solution in 3–4 (3–4) stages. The following reaction takes place at the regeneration stages:

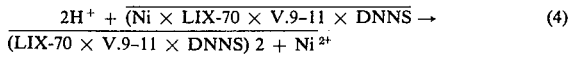

(4)

Thus, on the one hand, pure nickel solution 11 and, on the other hand, regenerated extraction solution 3 which is returned to the extraction stage, are removed from the regeneration stage. The performed extraction, washing, and regeneration experiments indicated that it is preferable to carry out the entire nickel/cobalt separation process at a slightly raised temperature, such as 50° C.

The strong darkening of the used extraction solution which contains "LIX-64N" during this metal separation is due to the oxidation of bivalent cobalt into a trivalent stage in when an extraction solution containing "LIX-70" is used, the extraction takes place at pH value 4 and because the separation achieved with this extraction solution is much sharper, no oxidation of cobalt then takes place in the extraction solution. The presence of the formed trivalent cobalt in an extraction solution which contains "LIX-64N" is also indicated by the fact that the organic phase is rather dark even after regeneration with sulphuric acid. After a repeated circulation of the said extraction solution, however, no greater amounts of cobalt than 0.5 g/l have been detected in the extraction solution regenerated with sulphuric acid. Thus, trivalent cobalt does not become concentrated to a noteworthy extent in the organic phase containing "LIX-64N." Therefore it is possible to carry out the said metal separation with an "LIX-64N"-based extraction solution without a protective atmosphere, such as nitrogen, which effectively prevents the oxidation of cobalt. Also, it is hardly necessary to perform a reducing regeneration with, for example, a sulphuric acid solution which contains hydrogen and which has been noted to effectively remove trivalent cobalt from the extraction solution.

The concerned separation process of nickel (II) and cobalt (II) has thus been developed into a cyclic extraction process in regard to the synergetic extraction solution. By this process it is possible, especially by using an "LIX-70"-based extraction solution, to obtain effective separation of nickel and cobalt from both sulphate, chloride and nitrate solutions by using only moderate amounts of, for example, ammonia and sulphuric acid.

DESCRIPTION OF THE DRAWING

The accompanying FIGURE shows a block-diagram of the separation process of nickel (II) and cobalt (II) when using the synergetic extraction solutions according to the invention.

DESCRIPTION OF THE PREFERRED EMBODIMENTS

The invention, of which an important embodiment is the separation of nickel (II) and cobalt (II) from each other, is described below with examples the purpose of which is to illustrate the great importance of the small addition of material to an appropriate extraction solution as a factor which increases the reaction velocity and prevents precipitation.

EXAMPLE 1

The following double extraction trial clearly indicates the great extent to which the reaction velocity in nickel extraction can be accelerated by adding, for example, DNNS, to a composition which contains "Versatic 9–11" and "LIX-64N." The Co content in the sulphate solution used was 25 g/l, Ni content 10 g/l, and $(NH_4)_2SO_4$ content 33 g/l. Prepared extraction agent composition I was a kerosene solution which contained 1.3 M "Versatic 9–11"/l and 25% by vol. "LIX-64N," while extraction agent composition II contained 0.01 M DNNS/l in addition to the above amounts of "Versatic 9–11" and "LIX-64N." According to the selected experiment method, both when using extraction agent composition I and when using extraction agent composition II similar extraction processes were carried out at room temperature by bringing 230 ml of sulphate solution in contact with 370 ml of extraction agent composition by propeller mixing. During the mixing, the pH was raised evenly to value 5 in 75 minutes by a continuous addition of gaseous ammonia diluted with air. At this time both the combined pH-electrode rod immersed in the phase dispersion and the ammonia feeding pipe ending in the dispersion also worked as breakers of the turbulent flow and had an improving effect on the mixing of the phases. Dispersion samples of 25 ml were taken regularly under continuous propeller mixing during the rising period of the pH value. By using a pH control based on measurements taken directly from the dispersion, the pH of the sulphate solution was further kept at 5 for 150 minutes while the mixing continued unchanged. Samples were again taken from the phase dispersion at different times.

Table 1

| pH values and time of sample-taking | | Ni content of sulphate solution | |
|---|---|---|---|
| | | Extraction agent composition I | Extraction agent composition II |
| Before extraction | | 10.0 | 10.3 |
| Extraction to pH value | 4.00 | 9.8 | 5.2 |
| Extraction to pH value | 4.50 | 8.7 | 2.7 |
| Extraction to pH value | 4.75 | 6.3 | 2.1 |
| Extraction to pH value | 5.00 | 3.9 | 1.9 |
| 10 min. at pH value | 5.00 | 3.0 | 1.8 |
| 30 min. at pH value | 5.00 | 2.2 | 1.8 |
| 60 min. at pH value | 5.00 | 2.0 | 1.8 |
| 150 min. at pH value | 5.00 | 1.9 | 1.8 |

The values in Table 1 clearly indicate that even a very small DNNS content in the said "Versatic 9–11"/"LIX-64N" composition decisively accelerates the extraction of nickel. This is a very important observation, since rapid extraction reactions have a basic importance in the concerned separation process of nickel (II) and cobalt (II).

EXAMPLE 2

The following is a detailed description of how the reaction velocities can be decisively improved according to the present invention when nickel is extracted from cobalt solutions with a composition of acids and oximes, by proceeding from a two-component composition which contains a carboxylic acid product, "Versatic 9-11," and an oxime product, "LIX-70," to a three-component composition which in addition to the said extraction agents contains small amounts of DNNS. The composition of the used extraction solution was: "Versatic 9-11" 1.3 M, DNNS 0.01 M, and "LIX-70" 25% by vol. For the sake of comparison, parallel experiments were performed with an extraction solution which contained the said amounts of "Versatic 9-11" and "LIX-70," but no sulphonic acid. The extraction of Ni took place from a sulphate solution in which the initial contents were: Co 25 g/l, Ni 10 g/l, and $(NH_4)_2SO_4$ 33 g/l. When pH was regulated at value 3.8 and the temperature was regulated at either 25° C. or 50° C., 120 ml of extraction solution and 75 ml of sulphate solution were brought in contact with each other in an extraction reactor with a volume of 250 ml, the number of revolutions being 560 min.$^{-1}$. Samples of the dispersion were taken at different times during the extraction. The obtained extraction results which clearly indicate the decisive importance of a small addition of a sulphonic acid as a factor which accelerates Ni extraction, are given in Tables 2 and 3. Thus, according to the invention, it is possible to obtain a unique separation of nickel and cobalt with an "LIX-70"-based extraction agent composition.

Table 2

| DNNS | Mixing period min. | Ni extraction % | Cu extraction % | Separation coefficient | pH |
|---|---|---|---|---|---|
| not present | 10 | 4.9 | 5.8 | 0.8 | |
| | 20 | 4.5 | 7.4 | 0.6 | |
| | 60 | 8.3 | 11.7 | 0.7 | |
| | 150 | 16.7 | 11.5 | 1.5 | 3.80 |
| | 330 | 31.7 | 10.0 | 4.2 | |
| | 550 | 46.7 | 7.9 | 10.2 | |
| | 960 | 59.2 | 6.4 | 21.2 | |
| present | 3 | 18.0 | 8.5 | 2.4 | |
| | 7 | 30.2 | 6.4 | 6.3 | |
| | 20 | 45.3 | 5.6 | 14.0 | 3.77 |
| | 45 | 65.8 | 3.6 | 52.1 | |
| | 90 | 72.9 | 2.9 | 91.1 | |
| | 135 | 77.1 | 2.7 | 120 | |

Extraction temperature 25° C

Table 3

| DNNS | Mixing period min. | Ni extraction % | Cu extraction % | Separation coefficient | pH |
|---|---|---|---|---|---|
| not present | 7 | 17.1 | 20.8 | 0.8 | |
| | 15.5 | 31.2 | 17.0 | 2.2 | |
| | 30 | 46.1 | 13.3 | 5.6 | 4.00 |
| | 60 | 65.9 | 8.4 | 21.3 | |
| | 120 | 83.7 | 4.5 | 110 | |
| | 240 | 86.1 | 4.5 | 131 | |
| present | 1 | 67.3 | 6.2 | 31.2 | |
| | 5 | 82.3 | 4.2 | 105 | |
| | 10 | 85.7 | 4.0 | 144 | 3.73 |
| | 20 | 85.8 | 4.1 | 140 | |
| | 30 | 86.2 | 3.9 | 155 | |

Extraction temperature 50° C

EXAMPLE 3

In the counter-current trial described below, the separation properties of an extraction agent composition which contained, on a light petrol base, 1.3 M "Versatic 9-11"/l, 0.01 M DNNS/l, and 25% by vol. "LIX-64N" were tested. The separation by extraction took place from a sulphate solution with a Co content of 25 g/l and a nickel content of 10 g/l. A five-stage mixer-settler type laboratory extraction apparatus was used. The entire counter-current extraction was carried out at 50° C. The average delay period in each mixer was regulated at about four minutes and the ratio between the volume flows of the organic phase and the water phase was controlled at value 2.6. pH control took place fully automatically at two stages, namely, the third and the fifth stages calculated from that end of the counter-current part at which nickel-containing cobalt solution was fed. The neutralizing agent used was gaseous ammonia diluted in nitrogen. The faultlessly working control was based on electrodes immersed in the mixers of each pH controlled stage; the measurement impulses obtained from these electrodes were fed to the control lines of which each stage had a separate one. This consisted of an amplified and a resilient control unit which through a guided magnet valve dispensed the gaseous neutralizing agent. After a steady state was reached, the extraction was interrupted and phase samples were taken from the settler of each stage.

Table 4

| | Initial solution | Stage | | | | |
|---|---|---|---|---|---|---|
| | | 1 | 2 | 3 | 4 | 5 |
| pH | 3.72 | 4.97 | 5.04 | 5.15 | 4.87 | 5.08 |
| Co cont. g/l | 25.0 | 31.0 | 34.0 | 30.5 | 30.0 | 20.2 |
| Ni cont. g/l | 10.0 | 4.7 | 0.89 | 0.109 | 0.047 | 0.0095 |

Table 4 shows the metal contents and pH values in the sulphate solutions of the various stages. The stages are numbered starting from that end of the extraction apparatus at which the nickel-containing cobalt solution is fed.

It has thus been proven with this continuous counter-current trial that very pure cobalt solutions can also be obtained with the prepared "LIX-64N"-based extraction agent composition. It is, however, preferable to raise the number of stages in the described counter-current extraction to 7-8, in which case the ratio between the volume flows of the organic phase and the aqueous phase can be somewhat lowered, while the ratio between the nickel and cobalt contents in the extraction solution which is fed into the washing part of the separation process can in this case be raised to 4-5, i.e., the extraction solution is brought to a balance with the sulphate solution which contains 25-30 g Co/l and 10 g Ni/l.

Let it be mentioned that the respective pH-controlled counter-current process with an "LIX-70"-based extraction agent composition yields, owing to its superior nickel-selectivity, a very pure cobalt solution already in five extraction stages.

EXAMPLE 4

When using the separation process of nickel (II) and cobalt (II) illustrated in the enclosed scheme, the ratio between the contents of these metals is raised, especially in an "LIX-64N"-based extraction solution, in the washing stages following the extraction stages to an entirely different order. That this is not difficult is evident from the following experiment, in which a nickel-rich extraction solution containing some cobalt and with metal contents corresponding to those which can be obtained in an extraction according to Example 3, was washed. In this light petrol-based extraction solution which contained 1.3 M "Versatic 9-11"/l, 0.01 M DNNS/l, and 25% by vol. "LIX-64N" the initial nickel content was 5.95 g/l and the initial cobalt content 1.9 g/l. The chosen washing solution was a neutral nickel sulphate solution in which the nickel content was 15 g/l. Mainly for the sake of experiment this counter-current wash was also carried out in five stages.

The ratio between the volume flows of the extraction solution and the sulphate solution was controlled at 50° C., and no pH control took place. After the steady state was obtained, the wash was discontinued and samples were taken from all phases from the settler of each stage. The obtained results of washing are shown in Table 5. The stages are numbered starting from that end of the extraction apparatus at which the metal-containing extraction solution is fed.

Table 5

|  | initial solution | Stage 1 | 2 | 3 | 4 | 5 |
|---|---|---|---|---|---|---|
| pH |  | 4.97 | 4.97 |  |  | 4.81 |
| Co cont. g/l | 1.90 | 0.58 | 0.36 | 0.28 | 0.25 | 0.22 |
| Ni cont. g/l | 5.95 | 7.24 | 7.49 | 7.61 | 7.56 | 7.59 |

Thus, this wash proved an effective method of lowering the cobalt content in the extraction solution. The cobalt which in spite of everything remained in the extraction solution in the washing experiment, in this case about 0.2 g/l, was most probably in a trivalent state. Because this trivalent cobalt is removed only to a limited extent in the sulphuric acid regeneration which follows, the obtained nickel sulphate solution is very pure. If washing is considered at all necessary for removing the insignificant cobalt amounts when using an "LIX-70," based extraction solution, the performed washing is very effective because there is not cobalt which is difficult to remove present in this extraction solution.

In the regeneration trials of the washed extraction solution it could be noted that nickel is removed from the extraction solution almost completely under the influence of a sulphuric acid solution even in the case that the sulphuric acid in the regeneration solution is almost completely consumed by the regeneration reaction. Thus, in a five-stage counter-current regeneration at the temperature of 50° C., a nickel sulphate solution was obtained in which the nickel content was about 40 g Ni/l. The pH of the nickel solution proved to be 2.6 and its cobalt content about 0.2 g/l. In this case the initial solution was the washed nickel-containing extraction solution gathered from the previous counter-current trial, and the regeneration solution was sulphuric acid solution with a content of 100 g $H_2SO_4$/l.

Owing to the advantageous regeneration balance it is obvious that the nickel content in the nickel sulphate solution obtained from the separation process can be raised if the sulphuric acid content in the sulphuric acid solution used for the regeneration agent is raised in proportion to the ratio between the volume flows of the extraction solution obtained from the regeneration and the sulphuric acid solution. Let it be mentioned that the regeneration balance related to the "LIX-70"-based extraction solution is also very advantageous for producing a strong nickel sulphate solution.

EXAMPLE 5

In the following parallel trials the simultaneous removal of iron and nickel took place from an aqueous solution which contained sodium sulphate, as an example of the fact that the extraction agent compositions can be excellently used for the extraction of several metallic impurities from aqueous solutions which contain, for example, an alkali metal, an earth alkali metal, and a rare earth metal. The sodium sulphate content in the prepared aqueous solution was 36 g $Na_2SO_4$/l, iron content 205 mg Fe/l, and nickel content 100 mg Ni/l. Used extraction agent composition I was a kerosene solution which contained 0.58 M "Versatic 9-11" and 12% by vol. "LIX-64N", while extraction agent composition II contained 0.02 M sulphonic acid/l in the form of "ECA 6414" in addition to the above amounts of "Versatic 9-11" and "LIX-64N". According to the performed extraction, 50 ml of water solution and 50 ml of extraction agent composition were mixed at room temperature with a propeller mixer, the number of revolutions being 520 min.$^{-1}$. The used mixer volume was slightly over 100 ml. The pH of the aqueous solution was controlled by pH measurements taken directly from the mixer either at 2.50 for the first 20 min. or at 2.50 for the first 10 min. and at 5.30 for the next 60 min. Keeping the pH constant with precision and the raising of the pH from 2.50 to 5.30, which took place in half a minute, were carried out with small additions of gaseous ammonia diluted with air.

It can be observed from the extraction results presented in Table 6 that by adding only a small amount of an appropriate sulphonic acid to the selected carboxylic acid/hydroxy-oxime composition, an extraction solution is obtained which reacts considerably faster with both iron and nickel. That this sulphonic acid addition completely prevents the precipitation caused by iron in the extraction solution when the pH of the water solution is brought above 3, is also a decisively important factor. This is very important because some iron is often present when removing metals of which the extraction ranges on the pH scale may considerably surpass the said pH value.

Table 6

| Mixing period | | | Extraction agent composition I | | Extraction agent composition II | |
|---|---|---|---|---|---|---|
| | | | Fe content mg/l | Ni content mg/l | Fe content mg/l | Ni content mg/l |
| 2.5 | min. | at pH value 2.5 | 183 | 103 | 68 | 46 |
| 5.0 | " | " 2.5 | 170 | 100 | 38 | 21 |
| 10 | " | " 2.5 | 143 | 100 | 19 | 8 |
| 20 | " | " 2.5 | 103 | 100 | 12 | 3 |
| 10 | min. | at pH value 2.5 | | | | |
| +2.5 | " | " 5.3 | 2.5 Fe | 70 | 2.5 | 2.5 |
| +5.0 | " | " 5.3 | 2.5 pre- | 32 | 2.5 | 2.5 |
| +10 | " | " 5.3 | 2.5 cip- | 17 | 2.5 | 2.5 |
| +20 | " | " 5.3 | 2.5 it- | 10 | 2.5 | 2.5 |
| +60 | " | " 5.3 | 2.5 ated | 2.5 | 2.5 | 2.5 |

What is claimed is:

1. An extraction agent composition for the separation from each other of nickel (II) and cobalt (II) in aqueous solutions containing such nickel and cobalt, which composition consists essentially of a hydrocarbon carboxylic acid having the formula

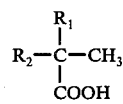

where $R_1$ and $R_2$ are alkyl groups such that the acid contains 9 to 11 carbon atoms in an amount sufficient to extract nickel and a hydroxy-oxime which is 5,8-diethyl-7-hydroxy-6-dodecyl oxime, 2-hydroxy-5-nonylbenzophenoxime, 2-hydroxy-3-chloro-5-nonylbenzophenoxime, or mixtures thereof, in a non-polar solvent, together with a small amount of dinonylnaphthalene sulphonic acid or 12–18 carbon atom-alkyl-substituted benzene sulphonic acid having a molecular weight of 330 to 390 sufficient to affect the phase interface tension and diminish the drop size of the dispersed phase and to accelerate the conversion of the material.

2. A composition according to claim 1 wherein there is present at least about 0.01 M of sulphonic acid.

3. A composition according to claim 1 wherein the non-polar solvent is kerosene.

4. A composition according to claim 1 wherein the sulphonic acid is dinonylnaphthalene sulphonic acid.

5. A composition according to claim 1 wherein the non-polar solvent contains from 0.58 to 1.3 moles of the carboxylic acid, 25 percent by volume of the hydroxyoxime, and up to 0.02 moles of the sulphonic acid.

* * * * *